US012421028B2

(12) United States Patent
Ruehr (10) Patent No.: US 12,421,028 B2
(45) Date of Patent: Sep. 23, 2025

(54) LOGISTICS SYSTEM (71) Applicant: KUKA Deutschland GmbH, Augsburg (DE)

(72) Inventor: Thomas Ruehr, Erlangen (DE)

(73) Assignee: KUKA Deutschland GmbH (DE)

( * ) Notice: Subject to any disclaimer, the term of this patent is extended or adjusted under 35 U.S.C. 154(b) by 0 days.

(21) Appl. No.: 17/916,163

(22) PCT Filed: Mar. 16, 2021

(86) PCT No.: PCT/EP2021/056627
§ 371 (c)(1),
(2) Date: Sep. 30, 2022

(87) PCT Pub. No.: WO2021/197833
PCT Pub. Date: Oct. 7, 2021

(65) Prior Publication Data
US 2023/0150764 A1    May 18, 2023

(30) Foreign Application Priority Data

Apr. 1, 2020   (DE) .................. 10 2020 204 272.1

(51) Int. Cl.
*B25J 9/04*    (2006.01)
*A01G 9/08*    (2006.01)
(Continued)

(52) U.S. Cl.
CPC .............. *B65G 1/04* (2013.01); *A01G 9/088* (2013.01); *B25J 5/007* (2013.01); *B25J 5/02* (2013.01);
(Continued)

(58) Field of Classification Search
CPC ...... A01G 9/088; A01G 9/143; A01G 9/0299; B25J 1/12; B25J 9/02; B25J 9/0093; B25J 9/106
See application file for complete search history.

(56) References Cited

U.S. PATENT DOCUMENTS 10,315,843 B2    6/2019   Magens et al.
11,078,945 B2 *  8/2021   Grout .................... A61B 34/30
(Continued)

FOREIGN PATENT DOCUMENTS

CN     207784804 U    8/2018
DE        3941754 A1    6/1991
(Continued)

OTHER PUBLICATIONS

Espacenet Translation of EP-2218521-A2 (Year: 2010).*
(Continued)

*Primary Examiner* — Katelyn T Truong
(74) *Attorney, Agent, or Firm* — Dorton & Willis, LLP (57) ABSTRACT A logistics system includes a first high-bay rack, at least one further high-bay rack, and at least one robot arm with a plurality of links and joints connecting the links for relative adjustment. One of the links is a bottom link of the robot arm which forms a base. The first high-bay rack has a first robot arm carrier with a first coupling device which, in a state in which the robot arm is coupled to the first robot arm carrier, interacts with a counter-coupling device of the bottom link of the robot arm in such a way that, in a first configuration of the logistics system, the bottom link of the robot arm is connected to the first robot arm carrier in an automatically locked and automatically releasable manner. The further high-bay rack has a further robot arm carrier with a further coupling device which, in a state in which the robot arm is coupled to the further robot arm carrier, interacts with the counter-coupling device of the bottom link of the robot arm
(Continued)

US 12,421,028 B2
Page 2 in such a way that, in a second configuration of the logistics system, which is different from the first configuration, the bottom link of the robot arm is connected to the further robot arm carrier in an automatically locked and automatically releasable manner.

3 Claims, 6 Drawing Sheets

(51) Int. Cl.
  *B25J 5/00* (2006.01)
  *B25J 5/02* (2006.01)
  *B65G 1/04* (2006.01)
  *B25J 19/00* (2006.01)

(52) U.S. Cl.
  CPC .............. *B25J 9/042* (2013.01); *B25J 19/005* (2013.01); *B65G 2203/0283* (2013.01)

(56) References Cited

U.S. PATENT DOCUMENTS

| | | | |
|---|---|---|---|
| 2011/0257786 A1* | 10/2011 | Caron L'Ecuyer | B25J 17/025 901/46 |
| 2014/0366443 A1 | 12/2014 | Brusatore | |
| 2019/0031349 A1* | 1/2019 | Schliwa, I | B25J 15/0019 |
| 2019/0337733 A1 | 11/2019 | Wehner et al. | |
| 2020/0156868 A1* | 5/2020 | Bidram | B65G 1/0492 |
| 2021/0147147 A1* | 5/2021 | Durai | B65G 1/06 |
| 2023/0092053 A1* | 3/2023 | Roth | B65G 1/1378 |

FOREIGN PATENT DOCUMENTS

| | | |
|---|---|---|
| DE | 102004024077 A1 | 12/2005 |
| DE | 102009014636 A1 | 9/2010 |
| DE | 102015220091 A1 | 4/2017 |
| DE | 102016222255 B3 | 4/2018 |
| DE | 102018110502 A1 | 11/2019 |
| EP | 2218521 A2 * | 8/2010 ......... B05B 13/0431 |
| WO | 2008091733 A2 | 7/2008 |
| WO | 2019109006 A1 | 6/2019 |

OTHER PUBLICATIONS

European Patent Office; Search Report in related International Patent Application No. PCT/EP2021/056627 dated Jun. 9, 2021; 3 pages.

German Patent Office; Office Action in related German Patent Application No. 10 2020 204 272.1 dated Feb. 2, 2021; 5 pages.

\* cited by examiner

LOGISTICS SYSTEM

CROSS-REFERENCE TO RELATED APPLICATIONS

This application is a national phase application under 35 U.S.C. § 371 of International Patent Application No. PCT/EP2021/056627, filed Mar. 16, 2021 (pending), which claims the benefit of priority to German Patent Application No. DE 10 2020 204 272.1, filed Apr. 1, 2020, the disclosures of which are incorporated by reference herein in their entirety.

TECHNICAL FIELD

The invention relates to a logistics system comprising a first high-bay rack and at least one further high-bay rack, as well as at least one robot arm which has a plurality of links and joints which connect the links so as to be automatically adjustable with respect to one another, wherein one of the links is a bottom link of the robot arm which forms a base. The logistics system according to the disclosure can be designed in particular for the automated operation of a greenhouse. Such a greenhouse can be configured for producing food, in particular in the form of so-called "vertical farming."

BACKGROUND

WO 2019/109006 A1 describes a system for the production of agricultural foodstuffs in buildings having a plurality of floors.

SUMMARY

The object of the invention is that of providing a logistics system which makes it possible to transfer and/or supply goods within individual high-bay racks in a particularly economical manner, in particular with high efficiency and a low level of personnel requirements. In particular, the object of the invention is that of providing a logistics system which makes it possible to transfer and/or supply plants, particularly in the context of the production of agricultural foodstuffs in buildings, in a particularly economical manner, in particular with high efficiency and a low level of personnel requirements.

The object is achieved according to the invention by a logistics system comprising a first high-bay rack and at least one further high-bay rack, as well as at least one robot arm which has a plurality of links and joints which connect the links so as to be automatically adjustable with respect to one another, wherein one of the links is a bottom link of the robot arm which forms a base, wherein the first high-bay rack comprises a first robot arm carrier which has a first coupling device which, in a state in which the robot arm is coupled to the first robot arm carrier, interacts with a counter-coupling device of the bottom link of the robot arm in such a way that, in a first configuration of the logistics system, the bottom link of the robot arm is connected to the first robot arm carrier in an automatically locked and automatically releasable manner, and the further high-bay rack comprises a further robot arm carrier which has a further coupling device which, in a state in which the robot arm is coupled to the further robot arm carrier, interacts with the counter-coupling device of the bottom link of the robot arm in such a way that, in a second configuration of the logistics system, which is different from the first configuration, the bottom link of the robot arm is connected to the further robot arm carrier in an automatically locked and automatically releasable manner.

The present logistics system can be used in particular in the form of a production logistics system or distribution logistics system. It is a component for the planning, the execution and the control of the movement or the storage of objects or goods within an organization system, which processes objects or goods according to prespecified, specific tasks. Processing can be the mere transportation the short-term or long-term storage of the objects or goods within the organization system. Even if the present logistics system is described as a logistics system for vertical agriculture within the scope of a specific embodiment, the present logistics system can also serve other purposes, for example, picking shipping items or the like.

The high-bay rack serves the purpose of storing the objects or goods in a plurality of storage levels arranged one above the other. Individual objects or goods can be combined, for example, in containers, on trays, or in the form of bundles. According to the specific embodiment of the logistics system, the high-bay rack can generally be designed to be stationary, i.e., fixed in place, or mobile, i.e. moving in space, and in particular can be designed to be movable.

In the same way, each further high-bay rack serves the purpose of storing the objects or goods in a plurality of storage levels arranged one above the other. Individual objects or goods can also be combined in this case, for example, in containers, on trays, or in the form of bundles. According to the specific embodiment of the logistics system, each further high-bay rack can be designed in the same manner to optionally be stationary, i.e., fixed in place or mobile, i.e., moving in space, and in particular can be designed to be movable. The term "further high-bay rack" is understood in particular to mean that any number of high-bay racks can be provided in the logistics system. For example, the logistics system can comprise, in addition to the first high-bay rack, a second high-bay rack, a third high-bay rack, a fourth high-bay rack, etc. Each high-bay rack can form a separate storage unit within the logistics system. The logistics system can be implemented within a single building. However, the logistics system can also extend over two or more buildings, such that different high-bay racks can be provided in different buildings.

The logistics system comprises at least one robot arm. However, the logistics system can also comprise two or more robot arms. Each robot arm can form an independent robotic unit. Each of the robot arms comprises a plurality of links and joints which connect the links so as to be automatically adjustable with respect to one another. For the purpose of automatically moving the relevant joint of the robot arm, a joint motor can be assigned to the joint, which joint motor automatically moves the joint in the desired manner when controlled by a control device, and the links of the robot arm, which are in each case connected by the joint, are thus adjusted relative to one another.

The bottom link of each of the robot arms, which forms the base, can also be referred to as a base frame. In this respect, it constitutes the foundation, proceeding from which the other links and the joints of the robot arm are moved. In the kinematic chain of the links and joints of the robot arm, the bottom link, which forms the base, is the proximal end of the kinematic chain, and a fastening flange of the robot arm is usually provided at a distal end of the kinematic chain that is opposite the proximal end, said fastening flange being designed to fasten an end effector to be moved by the robot arm. The robot arm may generally be designed in any kinematic configuration. However, it can be particularly expedient to configure the robot arm in the form of a SCARA robot arm or a lightweight robot arm. The design as a lightweight robot arm can be serial articulated arm kinematics with, in particular, seven degrees of freedom (joints).

The first robot arm carrier is part of the first high-bay rack assigned thereto. The first robot arm carrier can either be mounted on a structural component of the first high-bay rack in a stationary manner, i.e., so as to be fixed in place, or the first robot arm carrier can be mounted on one of the structural components of the first high-bay rack in a mobile manner, i.e., so as to not be fixed in space or so as to be movable and/or adjustable with respect to the structural components of the first high-bay rack. A single first robot arm carrier can be provided on the first high-bay rack, or a plurality of first robot arm carriers can be provided on the first high-bay rack. The mobile mounting of the first robot arm carrier on the first high-bay rack is described in more detail below.

The first coupling device is designed to interact with the counter-coupling device of the robot arm in a form-fitting and/or force-fitting manner, and can either have a locking state in which the first coupling device is connected to the counter-coupling device in a form-fitting and/or force-fitting manner, which connection is a temporary rigid connection which can be automatically released if necessary, or can have a released state in which the form-fitting and/or force-fitting connection between the first coupling device and the counter-coupling device is released, such that the first coupling device and the counter-coupling device can be separated automatically from each other and, as a result, the robot arm can be separated from the first high-bay rack. In other words, the robot arm can be removed from the first high-bay rack in the automatically released state. The removal of the robot arm from the first high-bay rack and/or the attachment of the robot arm to the first high-bay rack can accordingly take place in an automated manner, for example by means of a manipulator which is different and separate from the robot arm, or by means of a coupling machine described in more detail below. The coupling machine can either be mobile or stationary for this purpose.

The first coupling device can be designed for coupling only a single robot arm. Alternatively, the first coupling device can be designed for coupling two or more robot arms to the same robot arm carrier. Thus, at the same time, instead of just one single robot arm, two or more robot arms can also be coupled simultaneously to the first high-bay rack by means of the first coupling device. According to a specific embodiment of the first coupling device, the two or more coupled robot arms, when in their coupled states, can also be mounted on the first high-bay rack so as to be adjustable relative to one another. For example, the first coupling device can be formed by a toothed rack which is fixed to the first high-bay rack, it being possible for two or more robot arms to each comprise a drivable pinion, such that the two or more robot arms mounted displaceably on the toothed rack of the first high-bay rack can be moved independently of each other along the toothed rack, since the pinions of the two or more robot arms engage in the toothed rack in each case. In such a configuration, the two or more robot arms can accordingly be moved only relative to each other, since they "sit" on the same toothed rack and accordingly cannot change, i.e., swap, their order. However, the two or more robot arms can be detached from the first coupling device or attached to the first coupling device independently of each other, for example in order to change, in particular reduce or increase, the number of robot arms on the first high-bay rack, or to be able to swap the order of the different robot arms on the first coupling device. Instead of a combination of a toothed rack and a pinion, a combination of a spindle and a spindle nut can also be provided, for example. The pinion or the spindle nut can accordingly be provided on each of the robot arms. The pinion or the spindle nut is in particular designed to be driven, such that the relevant robot arm can be moved along the toothed rack or the spindle by driving the pinion or the spindle nut, respectively. A drive for the pinion or the spindle nut, which is in this respect part of the robot arm, can be supplied with electrical energy, for example, via a busbar of the first high-bay rack or by a battery of the robot arm.

The counter-coupling device can be designed corresponding to the first coupling device, according to the plug/socket principle. The counter-coupling device and the first coupling device can accordingly comprise form-fitting elements which engage in each other, such as catches, bars, latching hooks, and/or bayonet connection means. The corresponding form-fitting elements can comprise corresponding chamfers or conical surfaces in order to facilitate an automatic joining of the counter-coupling device and the first coupling device. In the same way, the further coupling device can also be designed corresponding to the counter-coupling device, according to the plug/socket principle. The counter-coupling device and the further coupling device can accordingly comprise form-fitting elements which engage with each other, such as catches, bars, latching hooks, and/or bayonet connection means. The corresponding form-fitting elements can comprise corresponding chamfers or conical surfaces in order to facilitate an automatic joining of the counter-coupling device and the further coupling device.

In the coupled state, the counter-coupling device of the robot arm is temporarily rigidly connected to the first coupling device or to the relevant further coupling device. The rigid connection can be automatically released if necessary, in order to automatically release the coupled state. In an automatically released state of the counter-coupling device, the robot arm can automatically be removed from the relevant first high-bay rack or further high-bay rack, and then brought together with another high-bay rack and automatically coupled to this other high-bay rack.

The relevant current configuration of the logistics system can be changed by the selective coupling of the robot arm to the first high-bay rack or the further high-bay rack, or the decoupling of the robot arm from the first high-bay rack or from the further high-bay rack. This change can be carried out automatically, in particular without the need for personnel, for example by means of a separate manipulator or a coupling machine, which is described in more detail below and which can be controlled automatically in each case.

Accordingly, the connection of the counter-coupling device to the first coupling device or to the relevant further coupling device can be automatically lockable and automatically releasable. Such a locking device can be electrically controlled, for example.

The further robot arm carrier is part of the further high-bay rack assigned thereto. The further robot arm carrier can either be mounted on a structural component of the further high-bay rack in a stationary manner, i.e., so as to be fixed in place, or the first robot arm carrier can be mounted on one of the structural components of the further high-bay rack in a mobile manner, i.e., so as to not be fixed in space or so as to be movable and/or adjustable with respect to the structural components of the further high-bay rack. A single further robot arm carrier can be provided on the further high-bay rack, or a plurality of further robot arm carriers can be provided on the further high-bay rack. The mobile mounting of the further robot arm carrier on the further high-bay rack is described in more detail below.

The further coupling device is designed to interact with the counter-coupling device of the robot arm in a form-fitting and/or force-fitting manner, and can either have a locking state in which the further coupling device is connected to the counter-coupling device in a form-fitting and/or force-fitting manner, which connection is a temporary rigid connection which can be automatically released if necessary, or can have a released state in which the form-fitting and or force-fitting connection between the further coupling device and the counter-coupling device is released, such that the further coupling device and the counter-coupling device can be separated automatically from each other and, as a result, the robot arm can be separated from the further high-bay rack. In other words, the robot arm can be removed from the further high-bay rack in the automatically released state. The removal of the robot arm from the further high-bay rack and/or the attachment of the robot arm to the further high-bay rack can accordingly take place in an automated manner, for example by means of a manipulator which is different and separate from the robot arm, or by means of a coupling machine described in more detail below. The coupling machine can either be mobile or stationary for this purpose.

The further coupling device can be designed for coupling only a single robot arm. Alternatively, the further coupling device can be designed for coupling two or more robot arms on the same robot arm carrier. Thus, at the same time, instead of just one single robot arm, two or more robot arms can also be coupled simultaneously to the further high-bay rack by means of the further coupling device. According to the specific embodiment of the further coupling device, the two or more coupled robot arms, when in their coupled states, can also be mounted on the further high-bay rack so as to be adjustable relative to one another. For example, the further coupling device can be formed by a toothed rack which is rigidly fixed to the further high-bay rack, it being possible for two or more robot arms to each comprise a drivable pinion, such that the two or more robot arms mounted displaceably on the toothed rack of the further high-bay rack can be moved independently of each other along the toothed rack, since the pinions of the two or more robot arms engage in the toothed rack in each case. In such a configuration, the two or more robot arms can accordingly be moved only relative to each other, since they "sit" on the same toothed rack and accordingly cannot change, i.e., swap, their order. However, the two or more robot arms can be detached from the further coupling device or attached to the further coupling device independently of each other, for example in order to change, in particular reduce or increase, the number of robot arms on the further high-bay rack, or to be able to swap the order of the different robot arms on the further coupling device. Instead of a combination of a toothed rack and a pinion, a combination of a spindle and a spindle nut can also be provided, for example. The pinion or the spindle nut can accordingly be provided on each of the robot arms. The pinion or the spindle nut is in particular designed to be driven, such that the relevant robot arm can be moved along the toothed rack or the spindle by driving the pinion or the spindle nut, respectively. A drive for the pinion or the spindle nut, which is in this respect part of the robot arm, can be supplied with electrical energy, for example, via a busbar of the further high-bay rack or by a battery of the robot arm.

Where a technical partial solution or a technical relationship with respect to a robot arm, i.e., a single robot arm, is described within the scope of the invention, it is nevertheless within the scope of the disclosure of the invention that a second, third or further robot arm can also be designed according to such a technical partial solution or in such a technical relationship.

In a further developed embodiment, the logistics system can comprise an automatic adjusting device which is designed to, in the first configuration of the logistics system in which the bottom link of the robot arm is coupled to the first robot arm carrier of the first high-bay rack, mount the bottom link of the robot arm so as to be adjustable in an automatically driven manner relative to the first high-bay rack, and, in the second configuration of the logistics system in which the bottom link of the robot arm is coupled to the further robot arm carrier of the further high-bay rack, to mount the bottom link of the robot arm so as to be adjustable in an automatically driven manner relative to the further high-bay rack.

In a first embodiment variant of the automatic adjusting device, it can be completely integrated into the relevant high-bay rack, i.e., the first high-bay rack or any further high-bay rack. This means that, for example, the first coupling device or the relevant further coupling device, for example, is mounted by means of the automatic adjusting device so as to be adjustable relative to the structural components of the first high-bay rack or the further high-bay rack, respectively, by means of the automatic adjusting device. If the robot arm, with its counter-coupling device, is then coupled to the corresponding coupling device, the robot arm can be automatically adjusted relative to the structural components of the first high-bay rack or the further high-bay rack by means of the automatic adjusting device.

In a second embodiment variant of the automatic adjusting device, the automatic adjusting device can be completely integrated into the robot arm. This means that, for example, the bottom link of the robot arm, which forms the base, is mounted by means of the automatic adjusting device so as to be adjustable relative to the counter-coupling device of said link by means of the automatic adjusting device. If the robot arm, with its counter-coupling device, is then coupled to the corresponding coupling device of the relevant high-bay rack, the robot arm can be automatically adjusted relative to its counter-coupling device, and consequently relative to the structural components of the first high-bay rack or the further high-bay rack, by means of the automatic adjusting device.

In a third embodiment variant of the automatic adjusting device, the automatic adjusting device can be formed by a connecting joint between the counter-coupling device of the robot arm and the corresponding coupling device of the relevant high-bay rack. As such, for example, a driven pinion can be mounted on the robot arm, which pinion engages in a toothed rack of the relevant high-bay rack in a state in which the robot arm is coupled to the relevant high-bay rack. The toothed rack can be rigidly connected to one of the structural components of the first high-bay rack or the further high-bay rack. As a result of a driven rotational movement of the pinion of the robot arm, the robot arm is reactively adjusted with respect to the high-bay rack, due to the engagement of the pinion in the toothed rack of the high-bay rack, when the robot arm is coupled to this high-bay rack. In a state in which the robot arm is coupled to a high-bay rack, the pinion of the robot arm is thus engaged with the toothed rack of the high-bay rack. If the robot arm is coupled to a different high-bay rack, the pinion of the robot arm engages with the other toothed rack of the other high-bay rack. In this third embodiment variant, the automatic adjusting device is therefore always formed by a connection of the robot arm to the respectively coupled high-bay rack.

In all embodiment variants, the automatic adjusting device can be designed as a linear drive. In the case of a linear drive, the automatic adjusting device executes a linear movement.

The linear movement of the automatic adjusting device can take place in particular in a vertical direction. In such an embodiment, the automatic adjusting device thus forms a lifting device.

Alternatively, however, the linear movement of the automatic adjusting device can also take place horizontally or diagonally, for example, or in another direction. The movement does not necessarily have to be a linear movement; rather, in a specific embodiment variant, the automatic adjusting device can specify a path which is different from a straight path.

By means of the automatic adjusting device, the robot arm, in the state in which it is coupled to a high-bay rack, can be selectively moved into the vicinity of a first storage level of the high-bay rack, or brought into the vicinity of another, further storage level of the high-bay rack. Optionally, the automatic adjusting device can be designed to bring the robot arm from a lateral side of the relevant high-bay rack to another lateral side of the relevant high-bay rack. As such, the robot arm can selectively reach into the relevant storage level from different sides.

The automatic adjusting device can be designed to, in the first configuration of the logistics system, mount the bottom link of the robot arm on the first high-bay rack in a linearly height-adjustable manner so as to be adjustable in an automatically driven manner, and, in the second configuration of the logistics system, to mount it on the further high-bay rack in a linearly height-adjustable manner so as to be adjustable in an automatically driven manner.

By means of the linearly height-adjustable adjusting device, the robot arm, in the state in which it is coupled to a high-bay rack, can be selectively moved into the vicinity of a first storage level of the high-bay rack, or into the vicinity of another, further storage level on the high-bay rack, which storage level is arranged on the high-bay rack at a different height. The linearly height-adjustable adjusting device can thus form a lifting device.

The linearly height-adjustable adjusting device can comprise, for example, a driven pinion which engages in a toothed rack. The toothed rack can, for example, be rigidly connected to one of the structural components of the first high-bay rack or the further high-bay rack. The driven pinion can, for example, be mounted on the coupling device, or be mounted directly in the robot arm. By means of a driven rotational movement of the pinion, the robot arm coupled to the relevant high-bay rack or to the relevant coupling device of the high-bay rack is reactively adjusted with respect to this high-bay rack.

Instead of an adjusting device in the form of a toothed rack and a pinion, the adjusting device can also be formed, for example, by a lifting spindle on which a spindle nut runs in a height-adjustable manner. The lifting spindle can, for example, be mounted on one of the structural components of the first high-bay rack or the further high-bay rack so as to be rotatably driven. The spindle nut, which is adjustable in height by the lifting spindle, can, for example, be connected to the coupling device or connected directly to the robot arm. By means of a driven rotational movement of the lifting spindle, the robot arm coupled to the relevant high-bay rack or to the relevant coupling device of the high-bay rack is reactively adjusted with respect to this high-bay rack. In a modification, the lifting spindle can be rigidly fixed and the spindle nut can be mounted so as to be rotatably driven.

As an alternative to a spindle drive or a toothed rack drive, the adjusting device can also be mounted so as to be adjustable in a driven manner by means of hydraulic cylinders or pneumatic cylinders.

The automatic adjusting device can comprise a drive which, when activated, is designed to move the bottom link of the robot arm relative to the first high-bay rack in an automatically driven manner in the first configuration, and, in the second configuration, to move the bottom link relative to the further high-bay rack in an automatically driven manner, the drive being designed as a part of the robot arm, which, together with the robot arm, is uncoupled from the first high-bay rack and/or from the further high-bay rack in a state in which it is uncoupled from the first high-bay rack and/or from the further high-bay rack.

The drive can be designed to drive an adjusting device designed as a spindle drive, a rack and pinion drive, a hydraulic device, and/or a pneumatic device, as described above.

The drive can in particular be an electromotive drive. Accordingly, the drive can comprise an electric motor.

A transmission can be associated with the motor, in particular the electric motor. The motor, in particular the electric motor, can be controlled automatically by a drive controller, in particular an electrical or electronic drive controller.

The drive can in particular be designed as a part of the robot arm. Alternatively, according to the embodiment, the drive can be designed as a part of a high-bay rack.

The robot arm can comprise an energy store which is designed to supply the drive and/or at least one robot arm joint motor, which is assigned to a joint of the robot arm in each case, with drive energy independently of the relevant configuration of the logistics system.

Because the robot arm has an energy store, the robot arm can be moved, i.e., driven, over the high-bay racks independently of an external energy supply, in particular independently of an energy supply.

The energy store can in particular be an electrical energy store, a hydraulic energy store, or a pneumatic energy store.

In the case of an electrical energy store, this can be an electrical battery, for example. The electrical battery can in particular be designed to be rechargeable.

The energy store can serve to supply the described drive of the adjusting device with energy, in particular electrical energy, such that the entire robot arm can be adjusted relative to the high-bay rack to which it is coupled by means of a supply from this energy store.

The energy store can also serve to supply the joint motors of the robot arm with energy, in particular electrical energy, such that the relevant pose of the robot arm can be adjusted by means of a supply from this energy store, i.e., the relative position and orientation of the links of the robot arm can be adjusted with respect to each other, specifically by driven movements of the joints of the robot arm.

Because the robot arm comprises the energy store, the robot arm can be repositioned, and/or its pose can be automatically changed, and/or the robot arm can be moved independently of the relevant configuration of the logistics system.

The energy store can be connected to a regeneration system, such as a regenerative brake of the robot arm, such that, for example, the braking energy applied for the deceleration and/or stopping of the moving robot arm can be used for charging the energy store. Such a recovery of energy is particularly expedient if each of the robot arms is mounted in a height-adjustable manner on the relevant high-bay rack, such that the potential energy which the robot arm releases when lowering from a higher position to a lower position can be stored in the form of preferably electrical energy.

The configuration of the logistics system is generally characterized in particular by the relevant current assignment of a robot arm or a plurality of robot arms to a high-bay rack or to a plurality of high-bay racks. For example, a single robot arm can be assigned to a plurality of different high-bay racks, the robot arm being selectively coupled to a single one of the plurality of high-bay racks at a time. Alternatively, a plurality of robot arms can also be assigned to a single high-bay rack, such that this high-bay rack can optionally be provided with one robot arm, two robot arms, or a plurality of robot arms at a certain point in time. As such, a single robot arm, or, simultaneously, two or more robot arms can thus be selectively coupled to one of the high-bay racks, in particular to a common robot arm carrier, a common toothed rack, a common spindle, or a common rail, such as a busbar.

The first high-bay rack can comprise at least one first busbar which is designed to supply electrical energy via the first high-bay rack to the robot arm if, in the first configuration, the robot arm is coupled to the first high-bay rack by means of the first coupling device, and the further high-bay rack can comprise at least one further busbar which is designed to supply electrical energy via the further high-bay rack to the robot arm if, in the second configuration, the robot arm is coupled to the further high-bay rack by means of the further coupling device.

By means of the at least one first busbar and/or by means of the at least one further busbar, electrical energy can be supplied to the robot arm via a high-bay rack when the robot arm is coupled to this high-bay rack. In this embodiment, a separate energy store on the robot arm can optionally be omitted.

In a specific embodiment, the logistics system can comprise at least one vehicle, in particular a driverless and/or autonomous vehicle, which has an automatic coupling machine which is designed to automatically couple the robot arm, which is transported by the at least one vehicle into a spatial proximity of the first high-bay rack, to the first coupling device of the first high-bay rack when the logistics system is to be brought into the first configuration, and the automatic coupling machine is designed to automatically couple the robot arm, which is transported by the at least one vehicle into a spatial proximity of the further high-bay rack, to the further coupling device of the further high-bay rack when the logistics system is to be brought into the second configuration.

In the basic embodiment, the vehicle can be designed in any desired manner. Accordingly, the vehicle can be driven by a person. Alternatively, the vehicle may be a driverless or autonomous vehicle.

If the vehicle is designed to be driven by a person, it can be provided, for example, that the person, i.e., the driver, manually couples the robot arm to be coupled to the first high-bay rack or to the further high-bay rack in each case. Alternatively, a mechanical or only partially automated coupling machine can be provided, which is designed to be manually actuated or manually controlled by a person, i.e., the driver. However, a fully automated coupling machine can also be provided in the case of a vehicle with a person as the driver. If the vehicle is controlled by a person, i.e., a driver, a fine positioning of the vehicle with respect to the first high-bay rack or of the further high-bay rack can also be carried out by the person, i.e., the driver, in order to precisely position the robot arm to be coupled in each case with respect to the first high-bay rack or the further high-bay rack, so that the robot arm can be securely coupled. In such a configuration, for example, special sensors for the fine positioning of the vehicle can then optionally be omitted.

The driverless vehicle does not necessarily have to drive autonomously, but can, for example, travel automatically in a controlled manner on fixedly prespecified or predefined paths. For example, the driverless vehicle can be a driverless transport system (DTS).

Driverless transport systems (DTS) are internal, floor-bound conveyor systems having automatically controlled vehicles, the primary task of which is material transport, but not passenger transport. They are used inside and outside buildings.

The vehicle can generally comprise a vehicle base body, wheels arranged on the vehicle base body, of which at least one of the wheels is associated with a travel drive, and the at least one travel drive is assigned a control device which is configured to move the vehicle within the logistics system. The travel drive can preferably be an electric drive, in particular a controlled electric travel drive. The automated guided vehicle can be designed, for example, as a holonomic or omnidirectional automated guided vehicle. In this case, the automated guided vehicle comprises omnidirectional wheels, preferably so-called Mecanum wheels, the travel drives of which are controlled by the control device.

Such an omnidirectional wheel vehicle can be designed for driverless driving. To this end, the omnidirectional wheel vehicle has a control device, which can also be referred to as a travel control device. The control device controls the directions of rotation and the rotational speeds, and/or optionally also the rotational accelerations of the driven wheels of the omnidirectional wheel vehicle, in an open-loop and/or closed-loop manner. Besides the driven wheels, the omnidirectional wheel vehicle can also comprise driveless wheels which are not controlled by the control device, and are only rotatably mounted on the vehicle body of the omnidirectional wheel vehicle, without being connected to a drive device. The omnidirectional wheel vehicle can be, for example, a driverless transport system (DTS).

In the case of an autonomous vehicle which can be designed according to the above-described embodiments, the vehicle can comprise a navigation system, a localization system, and also a path planning system in the broadest sense. In such a configuration, the vehicle can determine its trajectory, in particular the path, the velocity and the acceleration itself, within certain limits. The autonomous vehicle is also preferably designed to be driverless.

The automatic coupling machine uncouples the robot arm from a high-bay rack to which it has previously been coupled, and then couples the robot arm to another high-bay rack. The automatic coupling machine can be designed as a simple device which automatically performs the coupling and decoupling of the robot arm. In this respect, it may be sufficient if the coupling machine has, for example, only a single degree of freedom. Alternatively, the automatic coupling machine can be formed by a separate robot having a plurality of degrees of freedom. The robot can be configured to uncouple the robot arm from a high-bay rack and to couple it to another high-bay rack, for example using an end effector specifically adapted for this purpose. In a first variant, the automatic coupling machine, in particular the robot, can be attached to the described driverless and/or autonomous vehicle, and, by movement of the vehicle, the automatic coupling machine, in particular the robot, can be transported from a high-bay rack to the next high-bay rack in order to couple or uncouple the robot arm there.

The spatial proximity occurs when the vehicle is moved at least close enough to the corresponding high-bay rack that the automatic coupling machine can uncouple the coupled robot arm from the high-bay rack. The automatic coupling machine can then receive the robot arm and temporarily store it on the vehicle. By means of the vehicle, the robot arm can subsequently be moved, i.e., transported, to another high-bay rack and then coupled there to the other high-bay rack by means of the automatic coupling machine.

In addition or alternatively, however, the logistics system can also comprise a stationary changing station and at least one vehicle, in particular a driverless and/or autonomous vehicle, which is designed to selectively receive the first high-bay rack or the further high-bay rack in a transportable manner by movement of the at least one vehicle, the stationary changing station comprising an automatic coupling machine which is designed to automatically couple the robot arm to the first high-bay rack, which is transported by the at least one vehicle into a spatial proximity of the stationary changing station, or to uncouple it therefrom when the logistics system is to be changed between the first configuration and the second configuration, or to automatically couple the robot arm to the further high-bay rack, which is transported by the at least one vehicle into a spatial proximity of the stationary changing station, or to uncouple it therefrom when the logistics system is to be changed between the first configuration and the second configuration.

In this variant, the automatic coupling machine is formed on the stationary changing station and not on the vehicle. The vehicle in turn has receiving devices which are designed to receive and transport a relevant high-bay rack. As a result, the automatic coupling machine therefore does not come to the high-bay rack, but rather the high-bay rack comes to the stationary coupling machine.

The first high-bay rack, each further high-bay rack, the at least one vehicle, in particular the driverless and/or autonomous vehicle, the robot arm, and/or the stationary changing station can each comprise at least one sensor device which is designed to automatically determine the current relative position and/or relative orientation of the robot arm with respect to the first high-bay rack, to each further high-bay rack, to the at least one vehicle, in particular the driverless and/or autonomous vehicle, and/or to the stationary changing station.

The sensor device can comprise, for example, optical sensors such as cameras, laser scanners or the like, but also capacitive or magnetic sensors. The sensor device can also comprise optical markers such as, for example, barcodes or QR codes. Depending on the application, the sensor device can also comprise RFID tags.

In a specific embodiment of the logistics system, the logistics system can be a production logistics system and can be configured for the production of foodstuffs, in particular in the form of so-called "vertical farming."

Accordingly, the first high-bay rack and each further high-bay rack can each comprise a plurality of receiving levels for plants, the respective pluralities of receiving levels forming groups of first receiving levels which comprise lighting devices for plants, of second receiving levels which comprise water supply devices or nutrient solution supply devices for plants, and/or of third receiving levels which comprise temporary storage locations for plant carriers, the robot arm being designed and configured to automatically relocate plants or plant carriers between the first receiving levels, the second receiving levels and the third receiving levels within a first high-bay rack or a further high-bay rack when the robot arm is automatically coupled to the relevant first high-bay rack or further high-bay rack.

The plurality of receiving levels for plants can be formed, for example, by shelves. Individual plants, for example in sprouting pots or trays, can be placed directly on such shelves. Alternatively, a plurality of plants, for example arranged in groups on a tray, a pallet or a plant tray, can be placed on the shelves. In a further embodiment, the plurality of receiving levels can be formed by lateral receiving rails of the high-bay rack into which trays or pallets, for example, on which the plants or plant trays are placed, can be inserted or placed.

Each receiving level can be assigned a specific function. The different receiving levels within a high-bay rack or also between two different high-bay racks can accordingly be equipped for different purposes.

For example, first receiving levels may be assigned lighting devices for plants. Each of the lighting devices can be arranged at a distance above the placement surface of the relevant first receiving level. The lighting devices can thus be arranged, for example, on a downward-facing lower face of a receiving level lying directly above. The lighting devices can be formed, for example, by LED lighting means.

Second receiving levels may be assigned, for example, water supply devices or nutrient solution supply devices for plants. The water supply devices or nutrient solution supply devices can comprise corresponding outlet openings or outlet nozzles via which the water or the nutrient solution can exit and can be guided to the respective plants which are placed in this second receiving level, or to the root balls of said plants.

Third receiving levels can be designed, for example, as temporary storage locations for plant carriers. These temporary storage locations can be darkened, for example, to prevent the entry of light, or can be conditioned for a different climate, for example with respect to air humidity and/or temperature.

In the configuration in which the robot arm is coupled to a specific high-bay rack, the relevant robot arm can be designed and configured to automatically relocate the plants, the plant containers, and/or the plant carriers from one receiving level of the high-bay rack into another receiving level of the high-bay rack. In addition, the robot arm can be designed and configured to automatically completely remove plants, the plant containers, and/or the plant carriers from the specific high-bay rack, or to automatically place newly added plants, the plant containers, and/or the plant carriers into the high-bay rack.

Such a logistics system in the special embodiment of so-called "vertical farming" can makes it possible for specialized robot arms or manipulators which are used for planting, care, and harvesting of plants in the context of "vertical farming" to be able to be used automatically and in particular in a mobile manner on a plurality of, in particular stationary, racks. This promises a reduction in costs, since cost-intensive automation technology does not have to be procured multiple times, or only needs to be procured as much as is required globally in the system. This simplifies scaling and the reaction to unforeseen market developments.

For this purpose, a mobile vehicle can be used which can convey one or more manipulators, i.e., robot arms, such as, in particular, SCARA arms with specialized end effectors within the production facility. The mobile vehicle can be equipped with a mechanism, i.e., the automatic coupling machine, which can connect the carried robot arm to the high-bay rack, for example by means of a guide carriage of a linear guide and stationary linear rails. The mechanism can be, for example, an actuated multi-axis kinematic mechanism, or optionally a lifting mechanism with mechanical flexibility may also be sufficient. The mobile vehicle can be equipped with a sensor system, for example, which allows it to localize itself relative to the environment and to detect, with adequate precision, the position of the linear rails relative to the mobile robot for docking, for example using cameras, laser scanners or the like.

As already described, the racks can comprise devices for supplying water and/or nutrients, as well as illumination and/or holding systems for the plants, which can be equipped with or without a substrate. In addition, a linear rail on which the robot arm can be coupled can be mounted along a vertical path on the high-bay racks. The mechanism, i.e., the automatic coupling machine, can be used for this purpose, which coupling machine allows the coupled robot arm to raise or lower itself on the linear rail, for example by means of a toothed rack on the rack, in which a driven gearwheel (pinion) on the robot arm engages. In this case, an electrical connection can exist between the rack and the robot arm, for example via a rail having sliding contacts in which the robot arm can engage, in order to supply electrical energy, provided that the robot arm does not comprise a battery or an accumulator for this purpose. The rack can be equipped with markings in the manner of a linear measurement system, on the basis of which a sensor on the robot arm can determine, for example, the vertical position of the robot arm on the rack and can precisely adjust a desired target position.

The one robot arm or the plurality of robot arms may be equipped with a carriage for a guide mechanism that can be connected to the linear axis mounted on the rack. The linear axis can be, for example, a profile rail or a simple T-beam, and the robot arm can accordingly be equipped with a (spherical) guide carriage or a roller carriage. For this purpose, the robot arm can be equipped with a lifting motor which enables the lifting the robot arm on the rack. In addition, sliding contacts which act on the busbars can be provided. Depending on the purpose of the robot arm, it can be equipped with one or more driven axes, for example in a SCARA configuration, and optionally with at least one sensor and/or one special end effector.

Each robot arm carrier, in particular each carriage, each guide mechanism, each adjusting device, can comprise at least one sensor which, for example, detects the current position, in particular the vertical position, of the relevant robot arm on the robot arm carrier, in particular on the carriage, on the guide mechanism, or on the adjusting device. As such, each robot arm can be automatically moved to a specific position or vertical position on the corresponding coupled high-bay rack. The relevant sensors can comprise, for example, a marking, such as a bar code, a QR code, or another coding which can be detected by an optical receiver of the sensor and which contains information about its relevant position and/or vertical position. Instead of an optical marker, a magnetic marker can also be used, for example. Alternatively or additionally to fixedly attached markers on the high-bay racks, i.e., on the frames or structures of the high-bay racks, sensors, markers and information carriers can also be attached to shelves or to adjustable trays, basins, or flexibly usable trays. These sensors, markers or information carriers can be provided to cause an automatic control program, on the basis of the specific information from the sensors, markers or information carriers, to control, i.e., to move, the robot arm coupled to the particular high-bay rack in a manner determined by the specific information in each case.

Possible applications are, for example, the cleaning of the plant trays, the loading of the plant trays with substrate, the introduction of seed, the rouging of small plants and/or transplanting with greater spacing, weeding, the introduction of fertilizers and/or crop protection compositions, and/or harvesting. All of this can be controlled or monitored automatically by means of sensors or cameras.

The logistics system can thus be used for the automated operation of a greenhouse. In particular, the logistics system can thus enable particularly efficient vertical farming. In contrast to general agricultural greenhouses, which are generally operated on a single planting level and only use natural sunlight to grow the plants, vertical farming provides for the use of artificial light, such that, based on the use of artificial light sources at a plurality of height levels of the high-bay rack, plants that are positioned on top of each other in a plurality of levels can thrive.

The technologies known so far for vertical farming are still in the development stage and are usually based on greenhouses that are operated on one or more levels. The plants are grown by aeroponics or hydroponics. In connection with lighting technology for plant growth and ventilation systems, the plants flourish until harvest within the building or on the shelf of the system, i.e. the greenhouses.

In the known rack systems for vertical farming, automated technology is used in a manner very similar to the high-bay storage technology for logistics systems. This technology, which includes manual or automatic storage and retrieval machines, handles shelf-mounted and interchangeable tubs in which the plants thrive. In order to harvest the plants, workers move on the storage and retrieval machines or the tubs are transported to the harvesting area using complex conveyor technology.

The tub can be shell-like and/or closed-walled, that is to say watertight. The tubs contain the plant carrier or the plant carriers. The tubs remain in the greenhouse, where, however, the plant carriers can be removed from the tubs and, for example, removed during a harvest. The plant carriers can for example comprise a fixed frame, in particular an aluminum frame. The frame defines a grid on which the plants are arranged. The grid can be designed to be closely meshed.

With the automated operation of a greenhouse, a solution is created with which the production of agricultural foodstuffs in buildings is possible in a particularly economical manner, in particular with low personnel requirements and high energy efficiency. In particular, existing buildings, such as high-rise buildings or abandoned factories, especially in large cities, can be converted into alternative uses as greenhouses.

The plants can in particular be plants that serve as food for living beings, for example vegetables, fruit, culinary herbs, tea plants. However, the plants can also be other useful plants, such as medicinal plants, cosmetic plants or aromatic plants.

The plant carrier located in the tub forms a receptacle for the required substrate on which the plants thrive. At the same time, the plant carrier has the function of carrying the plants planted in the substrate. The relevant plant carrier can be designed to accommodate a single plant. Alternatively, the relevant plant carrier can be designed to accommodate a plurality of plants at the same time, in particular of the same plant species and/or plant variety. A plurality of plant carriers can be arranged on the same level of a high-bay rack. Alternatively or in addition, a plurality of plant carriers can be arranged on a plurality of different height levels of a high-bay rack or a plurality of high-bay racks. The plurality of plant carriers can in particular be stored in one or more tubs on a common mobile or stationary high-bay rack. Each tub can comprise one or more plant carriers.

Specific embodiments of the invention are explained in more detail in the following descriptions with reference to the accompanying figures. Specific features of these embodiments, possibly considered individually or in further combinations, can represent general features of the invention, regardless of the specific context in which they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
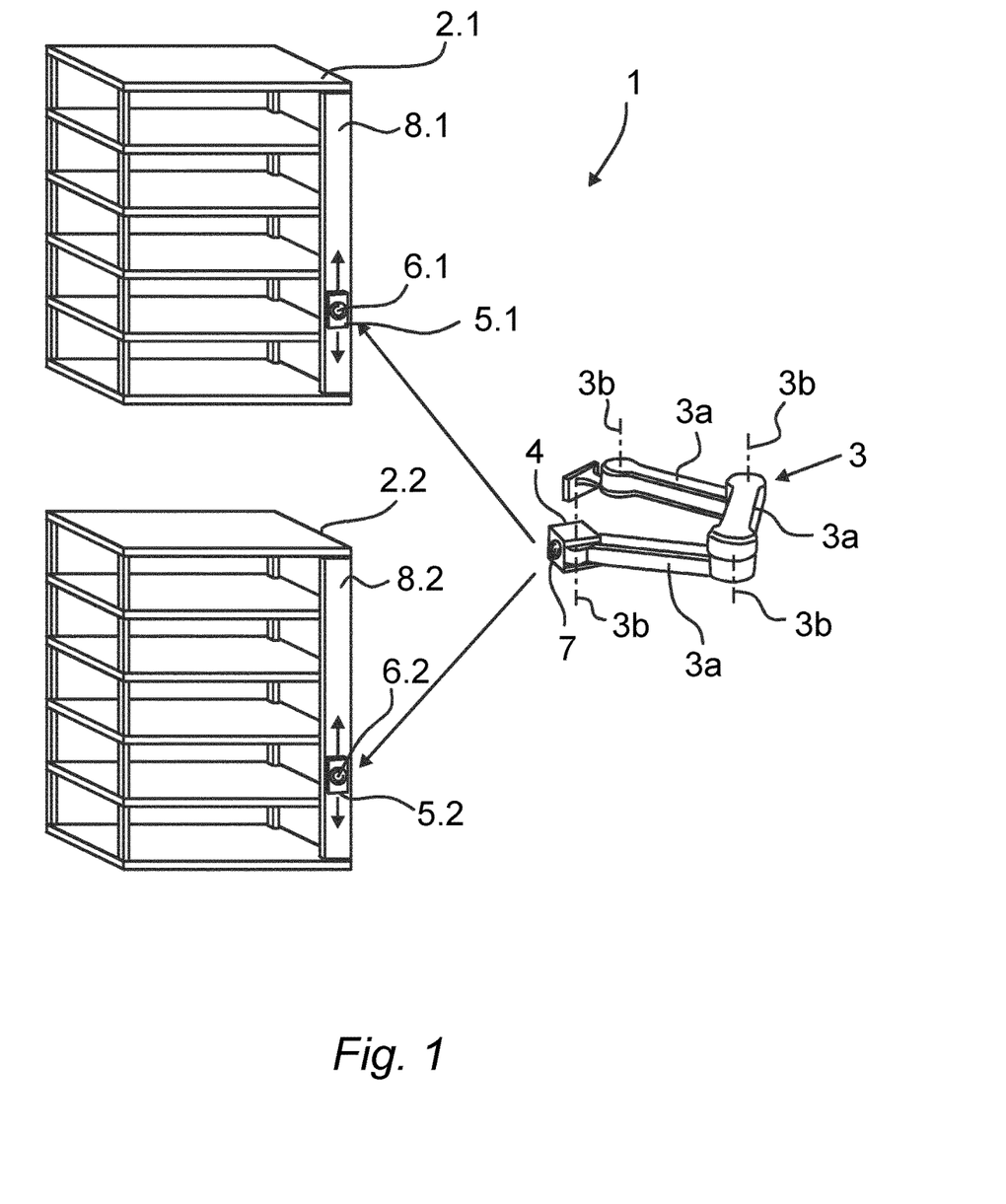
FIG. 1 is a schematic view of a basic logistics system according to the invention.

FIG. 1 is an exemplary logistics system 1 according to the present disclosure with its basic components.

The logistics system 1 comprises a first high-bay rack 2.1 and at least one further high-bay rack 2.2, as well as at least one robot arm 3 which has a plurality of links 3a and joints 3b which connect the links 3a so as to be automatically adjustable with respect to one another. One of the links 3a is designed as a bottom link 4 which forms the base of the robot arm 3. The first high-bay rack 2.1 comprises a first robot arm carrier 5.1 which has a first coupling device 6.1 which, in a state in which the robot arm 3 is coupled to the first robot arm carrier 5.1, works together with a counter-coupling device 7 of the bottom link 4 of the robot arm 3 in such a way that, in a first configuration of the logistics system 1 (FIG. 1 at the top), the bottom link 4 of the robot arm 3 is connected to the first robot arm carrier 5.1 in an automatically locked and automatically releasable manner. The further high-bay rack 2.2 comprises, in the same way, a further robot arm carrier 5.2 which has a further coupling device 6.2 which, in a state in which the robot arm 3 is coupled to the further robot arm carrier 5.2, works together with the counter-coupling device 7 of the bottom link 4 of the robot arm 3 in such a way that, in a second configuration (FIG. 1 at the bottom) of the logistics system 1, which is different from the first configuration (FIG. 1 at the top), the bottom link 4 of the robot arm 3 is connected to the further robot arm carrier 5.2 in an automatically locked and automatically releasable manner.

In the case of the embodiment shown, the logistics system 1 comprises an automatic adjusting device 8.1, 8.2 which is designed to, in the first configuration of the logistics system 1, in which the bottom link 4 of the robot arm 3 is coupled to the first robot arm carrier 5.1 of the first high-bay rack 2.1, mount the bottom link 4 of the robot arm 3 so as to be adjustable in an automatically driven manner relative to the first high-bay rack 2.1, and, in the second configuration of the logistics system 1, in which the bottom link 4 of the robot arm 3 is coupled to the further robot arm carrier 5.2 of the further high-bay rack 2.2, to mount the bottom link 4 of the robot arm 3 so as to be adjustable in an automatically driven manner relative to the further high-bay rack 2.2.

The automatic adjusting device 8.1, 8.2 can be designed to, in the first configuration of the logistics system 1, mount the bottom link 4 of the robot arm 3 on the first high-bay rack 2.1 in a linearly height-adjustable manner so as to be adjustable in an automatically driven manner, and, in the second configuration of the logistics system 1, to mount it on the further high-bay rack 2.2 in a linearly height-adjustable manner so as to be adjustable in an automatically driven manner.

Figure 2:
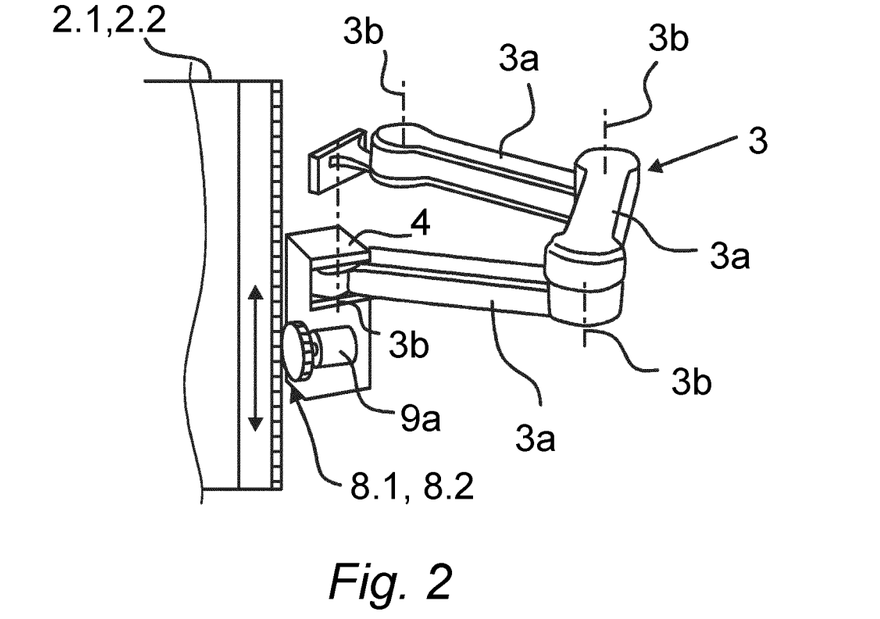
FIG. 2 is a schematic view of an example of an automatic adjusting device of the logistics system with a drive on the robot arm.

In a first embodiment variant according to FIG. 2, the automatic adjusting device 8.1, 8.2 can comprise a drive 9a which, when activated, is designed to move the bottom link 4 of the robot arm 3 relative to the first high-bay rack 2.1 in an automatically driven manner in the first configuration, and, in the second configuration, to move the bottom link relative to the further high-bay rack 2.2 in an automatically driven manner, the drive 9a being designed as a part of the robot arm 3 which, together with the robot arm 3, is uncoupled from the first high-bay rack 2.1 and/or from the further high-bay rack 2.2 in a state in which it is uncoupled from the first high-bay rack 2.1 and/or from the further high-bay rack 2.2.

Figure 3:
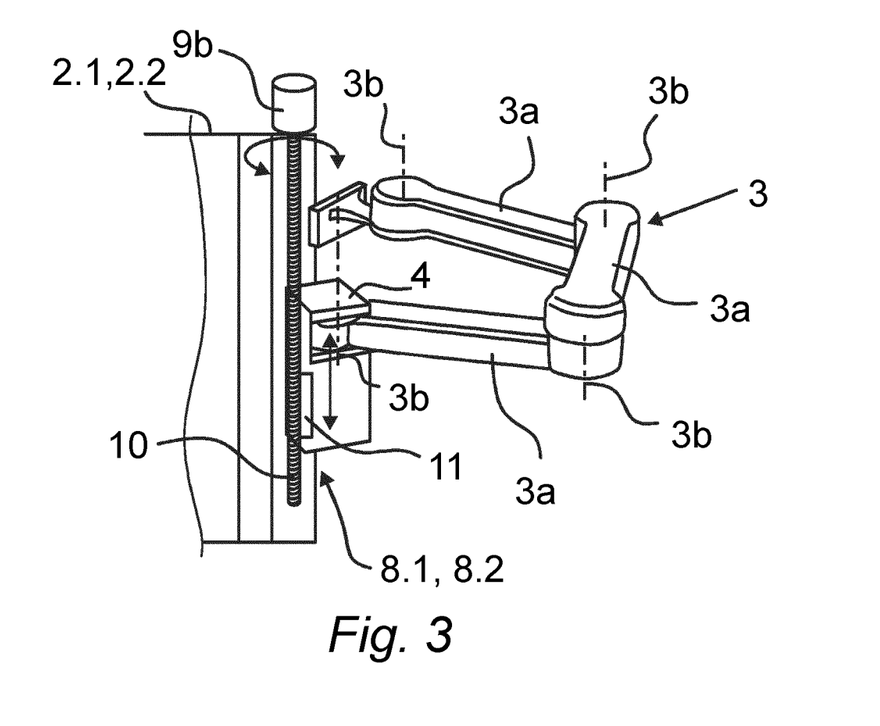
FIG. 3 is a schematic view of an example of an automatic adjusting device of the logistics system with a drive on the high-bay rack.

In a second embodiment variant according to FIG. 3, the automatic adjusting device 8.1, 8.2 can comprise a drive 9b which, when activated, is designed to move the bottom link 4 of the robot arm 3 relative to the first high-bay rack 2.1 in an automatically driven manner in the first configuration, and, in the second configuration, to move the bottom link relative to the further high-bay rack 2.2 in an automatically driven manner, the drive 9b in each case being designed as a part of the first high-bay rack 2.1 and as a part of the further high-bay rack 2.2. In this case, for example, a lifting spindle 11 can be associated with each drive 9b, i.e., one lifting spindle 11 is provided per first high-bay rack 2.1 and further high-bay rack 2.2, which lifting spindle is driven by the drive 9b. A height-adjustable spindle nut 12, which is connected to the bottom link 4 of the robot arm 3, sits on the lifting spindle 11.

Figure 4:
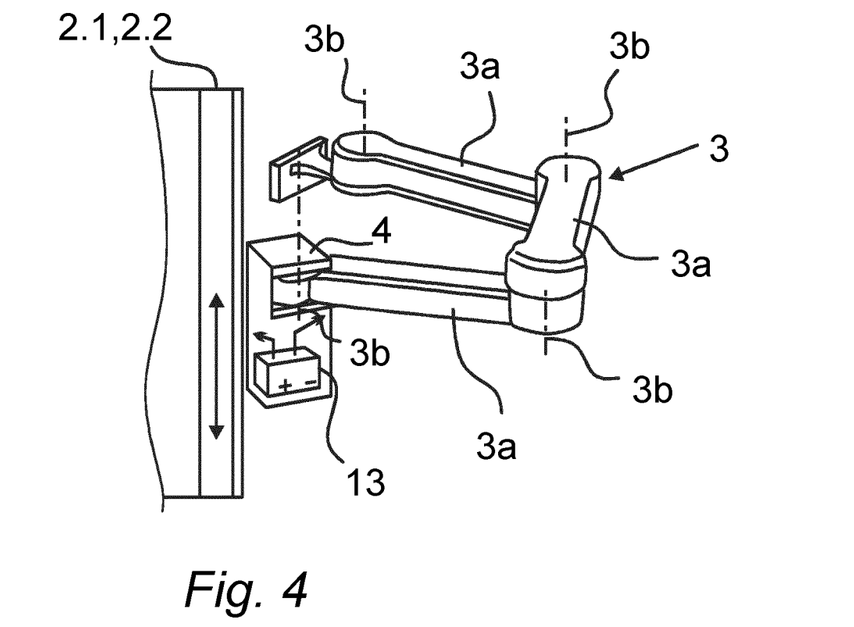
FIG. 4 is a schematic view of an example of an automatic adjusting device of the logistics system with an energy store on the robot arm.

In the embodiment variant according to FIG. 4, the robot arm 3 comprises an energy store 13 which is designed to supply drive energy to the drive 9a and/or at least one joint motor of the robot arm 3, which is assigned to a joint 3b of the robot arm 3 in each case, independently of the relevant configuration of the logistics system 1.

Figure 5:
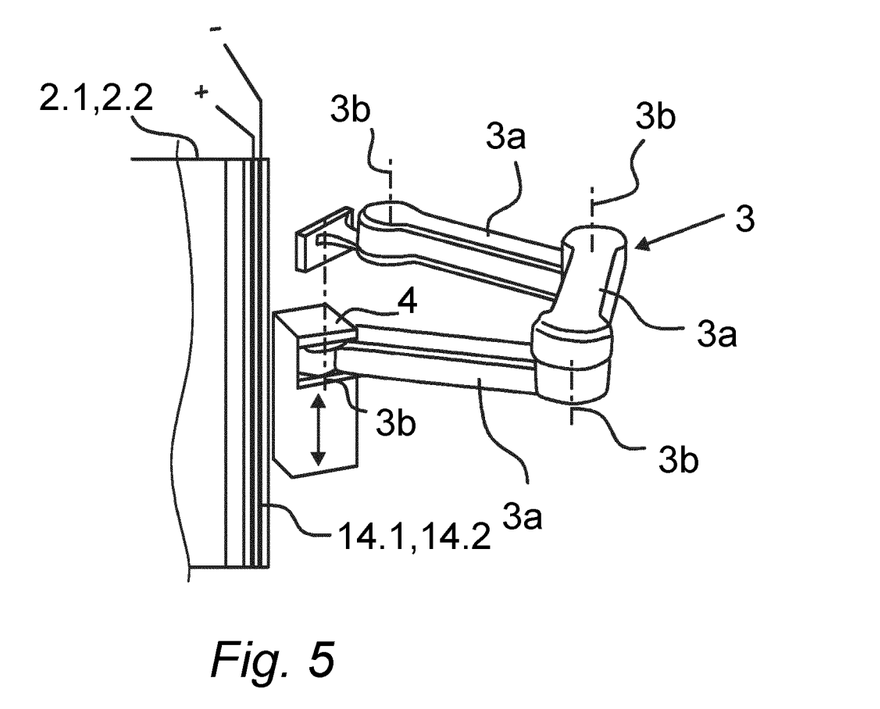
FIG. 5 is a schematic view of an example of an automatic adjusting device of the logistics system with a busbar on the high-bay rack.

In the embodiment variant according to FIG. 5, the first high-bay rack 2.1 comprises at least one first busbar 14.1 which is designed to supply electrical energy via the first high-bay rack 2.1 to the robot arm 3 if, in the first configuration, the robot arm 3 is coupled to the first high-bay rack 2.1 by means of the first coupling device 5.1. The further high-bay rack 2.2 can also comprise at least one further busbar 14.2 which is designed to supply electrical energy via the further high-bay rack 2.2 to the robot arm 3 if, in the second configuration, the robot arm 3 is coupled to the further high-bay rack 2.2 by means of the further coupling device 5.2.

Figure 6:
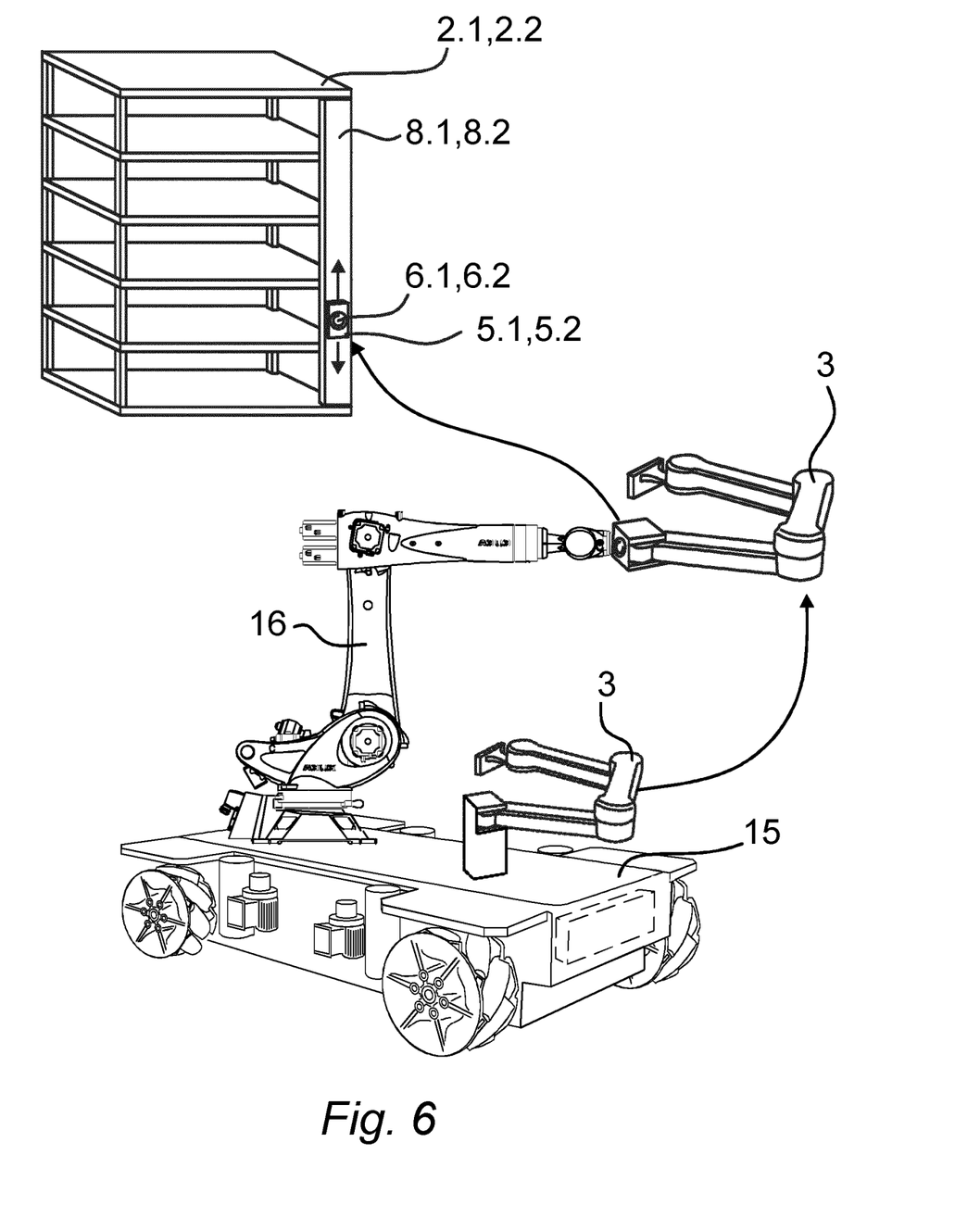
FIG. 6 is a schematic view of an example of a driverless/autonomous vehicle with a robot as an automatic coupling machine and a robot arm handled therewith for selectively coupling to the first high-bay rack or the further high-bay rack.

In an embodiment according to FIG. 6, the logistics system 1 can comprise at least one driverless and/or autonomous vehicle 15 which has an automatic coupling machine 16, for example in the manner of a robot, which is designed to automatically couple the robot arm 3, which is transported by the at least one vehicle 15 into a spatial proximity of the first high-bay rack 2.1, to the first coupling device 5.1 of the first high-bay rack 2.1 when the logistics system 1 is to be brought into the first configuration, and the automatic coupling machine 16 is designed to automatically couple the robot arm 3, which is transported by the at least one vehicle 15 into a spatial proximity of the further high-bay rack 2.2, to the further coupling device 5.2 of the further high-bay rack 2.2 when the logistics system 1 is to be brought into the second configuration.

Figure 7:
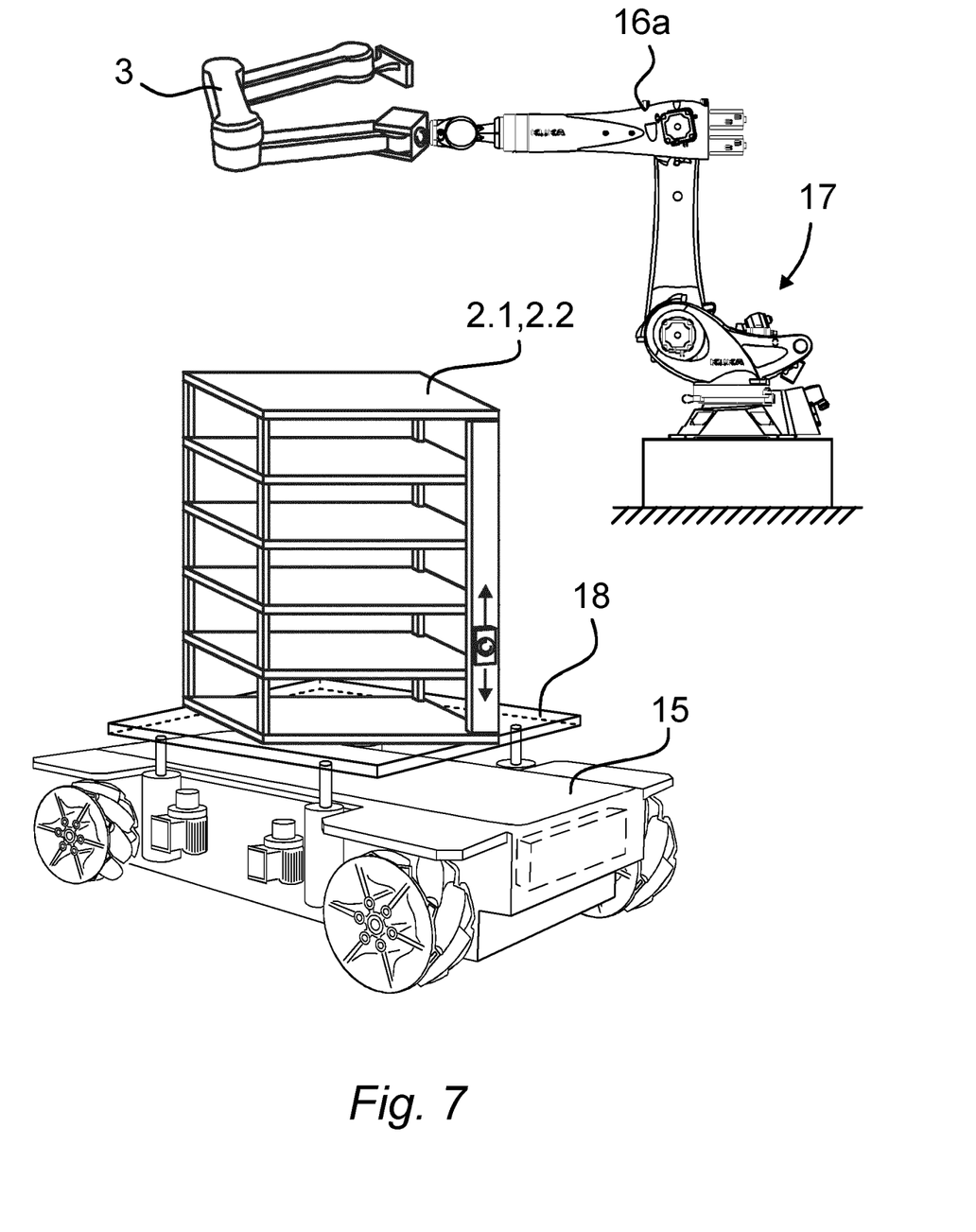
FIG. 7 is a schematic view of an example of a driverless/autonomous vehicle with a received transportable high-bay rack and a stationary changing station.

In a modified embodiment, the logistics system 1 can comprise a stationary changing station 17 and at least one driverless and/or autonomous vehicle 15 which is designed to selectively receive the first high-bay rack 2.1 or the further high-bay rack 2.2 in a transportable manner by movement of the at least one vehicle 15, for example by means of a lifting platform 18, the stationary changing station 17 comprising an automatic coupling machine 16*a* which is designed to automatically couple the robot arm 3 to the first high-bay rack 2.1, which is transported by the at least one vehicle 15 into a spatial proximity of the stationary changing station 17, or to uncouple it therefrom when the logistics system 1 is to be changed between the first configuration and the second configuration, or to automatically couple the robot arm 3 to the further high-bay rack 2.2, which is transported by the at least one vehicle 15 into a spatial proximity of the stationary changing station 17, or to uncouple it therefrom when the logistics system 1 is to be changed between the first configuration and the second configuration.

Figure 8:
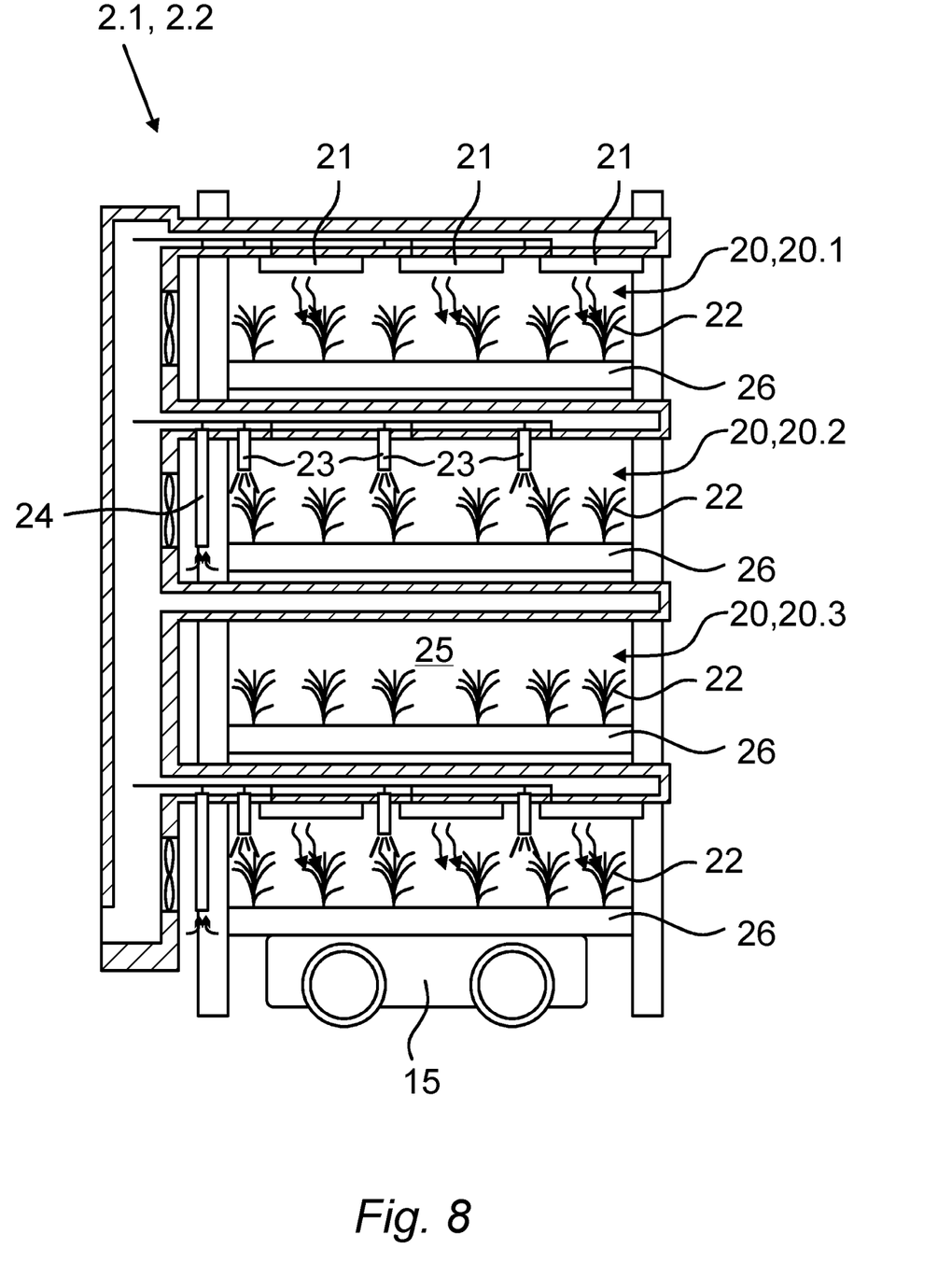
FIG. 8 is a schematic view of a high-bay rack in a design for vertical farming.

As is shown schematically in FIG. 8, the first high-bay rack 2.1 and each further high-bay rack 2.2 can each comprise a plurality of receiving levels 20 for plants, the respective pluralities of receiving levels 20 forming groups of first receiving levels 20.1 which comprise lighting devices 21 for plants 22, of second receiving levels 20.2 which comprise water supply devices 23 or nutrient solution supply devices 24 for plants, and/or of third receiving levels 20.3 which comprise temporary storage locations for plant carriers 20, wherein the robot arm 3 is designed and configured to relocate plants 22 or plant carriers 20 automatically between the first receiving levels 20.1, the second receiving levels 20.2 and the third receiving levels 20.3 within a first high-bay rack 2.1 or a further high-bay rack 2.2 when the robot arm 3 is automatically coupled to the relevant first high-bay rack 2.1 or further high-bay rack 2.2.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A logistics system, comprising:
a first high-bay rack and at least one second high-bay rack;
at least one robot arm, the at least one robot arm including a plurality of links and joints which connect the links so as to be automatically adjustable with respect to one another;
wherein one of the plurality of links is a base link of the at least one robot arm which forms a base;
the first high-bay rack including a first robot arm carrier with a first coupling device which, in a state in which the at least one robot arm is coupled to the first robot arm carrier, interacts with a counter-coupling device of the base link of the at least one robot arm in such a way that, in a first configuration of the logistics system, the base link of the at least one robot arm is connected to the first robot arm carrier in an automatically locked and automatically releasable manner; and
the at least one second high-bay rack including a second robot arm carrier with a second coupling device which, in a state in which the at least one robot arm is coupled to the second robot arm carrier, interacts with the counter-coupling device of the base link of the at least one robot arm in such a way that, in a second configuration of the logistics system, which is different from the first configuration, the base link of the at least one robot arm is connected to the second robot arm carrier in an automatically locked and automatically releasable manner;
a stationary changing station; and
at least one vehicle which is designed to selectively receive the first high-bay rack or the second high-bay rack in a transportable manner by movement of the at least one vehicle;
wherein the stationary changing station includes an automatic coupling machine which is designed to:
automatically couple the at least one robot arm to the first high-bay rack, which is transported by the at least one vehicle into a spatial proximity of the stationary changing station, or to uncouple the at least one robot arm therefrom, when the logistics system is to be changed between the first configuration and the second configuration, or
automatically couple the at least one robot arm to the second high-bay rack, which is transported by the at least one vehicle into a spatial proximity of the stationary changing station, or to uncouple the at least one robot arm therefrom, when the logistics system is to be changed between the first configuration and the second configuration.

2. The logistics system of claim 1, wherein the at least one vehicle is at least one of a driverless vehicle or an autonomous vehicle.

3. The logistics system of claim 1, wherein:
at least one of the first high-bay rack, the at least one second high-bay rack, the at least one vehicle, the at least one robot arm, or the stationary changing station comprises at least one sensor device; and the at least one sensor device is designed to automatically determine at least one of the current relative position or current relative orientation of the at least one robot arm with respect to at least one of the first high-bay rack, the at least one second high-bay rack, the at least one vehicle, or the stationary changing station.

\* \* \* \* \*